US006615116B2

(12) United States Patent
Ebert et al.

(10) Patent No.: US 6,615,116 B2
(45) Date of Patent: Sep. 2, 2003

(54) METHOD AND APPARATUS FOR COMMUNICATING BETWEEN AN AIRCRAFT AND AN ASSOCIATED STORE

(75) Inventors: William J. Ebert, Kirkwood, MO (US); James V. Leonard, St. Charles, MO (US); Richard E. Meyer, Florissant, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/925,263

(22) Filed: Aug. 9, 2001

(65) Prior Publication Data

US 2003/0033059 A1 Feb. 13, 2003

(51) Int. Cl.$^7$ ................................................. G06C 7/00
(52) U.S. Cl. ..................... 701/3; 701/1; 244/2
(58) Field of Search ........................ 701/1, 3; 244/2, 244/3.1; 102/293

(56) References Cited

U.S. PATENT DOCUMENTS 4,825,151 A    4/1989    Aspelin
5,034,686 A    7/1991    Aspelin
5,541,839 A    7/1996    Mitzkus et al.
5,548,510 A    8/1996    Ebert et al.
5,931,874 A    8/1999    Ebert et al.
6,122,569 A    9/2000    Ebert et al.

Primary Examiner—Yonel Beaulieu
(74) Attorney, Agent, or Firm—Alston & Bird LLP

(57) ABSTRACT

A signal conditioning system for translating communications between an aircraft and an associated store includes a store umbilical element that electrically and mechanically couples the aircraft and the store. The system also includes a signal conditioning element having an ASIC and electrically connected between the aircraft the store. The signal conditioning element is capable of being incorporated within the umbilical element and includes a translation element for receiving first predetermined format communications from the aircraft at the first predefined transfer rate and thereafter outputting corresponding second predetermined format communications to the store at at least one second transfer rate. Conversely, the translation element is also capable of receiving second predetermined format communications from the store at the at least one second transfer rate and thereafter outputting corresponding first predetermined format communications to the aircraft at the first predefined bit rate.

21 Claims, 7 Drawing Sheets

METHOD AND APPARATUS FOR COMMUNICATING BETWEEN AN AIRCRAFT AND AN ASSOCIATED STORE

FIELD OF THE INVENTION

The present invention relates generally to a signal conditioning method and apparatus and, more particularly, to a method and apparatus communicating between an aircraft and an associated store.

BACKGROUND OF THE INVENTION

Modern aircraft, such as an F-15E aircraft manufactured by the assignee of the present invention, and the P-3, the S-3 and the F-16 aircraft manufactured by Lockheed Aeronautical Systems Company, are adapted to carry stores. These stores can, for example, include missiles, such as the Joint Direct Attack Munition (JDAM), Walleye missile, the Standoff Land Attack missile (SLAM), the SLAM-ER, the Harpoon missile, and the Maverick missile. A missile is generally mounted to the wing of a host aircraft, typically via disconnectable pylons, such that the aircraft can carry the missile to the vicinity of the target destination prior to its deployment.

Prior to and during deployment of a store, the aircraft and the associated store communicate. For example, signals are bidirectionally transmitted between the aircraft and the store to appropriately configure and launch the store. This prelaunch configuration can include downloading the coordinates of the target and initializing the various sensors of the store. In addition, a store, such as a SLAM missile, can transmit a video image, typically via radio frequency (RF) signals, of the target to the aircraft after deployment so that the flight path of the store can be monitored, and, in some instances, controlled to provide greater targeting accuracy.

In order to provide bidirectional signal transmission between the aircraft and the associated store, a host aircraft typically includes an aircraft controls and displays module under the control of a central computer, or aircraft controller. The aircraft controls and displays module provides an interface by which the crew of the aircraft can monitor and control their flight pattern and can provide armament control, such as to control the deployment of the associated store. The aircraft controls and displays module typically includes both discrete controls, such as toggle switches, as well as a joystick for positioning and selecting a cursor within the associated display. The aircraft controls and displays module also provides the necessary avionics to fly the aircraft and to communicate with other aircraft and ground base control stations.

Both the aircraft and the associated store typically process signals according to a predetermined format. As used herein, format refers not only to the actual configuration of the data structures, but also to the content and order of transmission of the signals. The predetermined formats of the aircraft and the store are oftentimes different. In order to ensure proper signal reception by the host aircraft and the associated store, the signals must thus be provided to the aircraft or store in the predetermined format that the aircraft or store is adapted to process.

Aircraft are typically designed to carry a plurality of stores, some of which may process signals according to the same format as the aircraft, and others which may process signals according to a different format. Many aircraft, such as the F-16 Block 60 aircraft, process signals according to a Mil-Std-1760 format. Certain types of missiles, such as the SLAM-ER missile, the JDAM missile, communicate according to the Mil-Std-1760 format. It is not uncommon, however, for other types of stores associated with the F-16 aircraft to process signals according to a different signal format. Missiles such as the Harpoon Block I missile, the SLAM missile, and the Harpoon Block II missile, communicate according to a MK 82 data format. In this regard, the MK 82 and the Mil-Std-1760 formats are different, not only in their respective data structures, but also in the physical connections required for their respective interfaces.

To facilitate the communication between the aircraft and the stores that process signals according to a different format, these stores are coupled to a tailored electronics or avionics system. This avionics system, generally referred to as a weapon interface system (WIS), serves as an interface between the aircraft, specifically the aircraft controller, and the store. With respect to Harpoon Block I missiles, which process signals according to the MK 82 format, a device such as a Harpoon Interface Adapter Kit (HIAK) may generally serve as an interface between the missile and aircraft such as the F-16 aircraft, wired for carriage of 1760 type stores. The HIAK typically receives commands from the aircraft controller according to the 1760 format and translates these commands to provide MK 82 formatted data usable by Harpoon Block I missiles. In addition, the HIAK controls and provides launch power to the aircraft ejectors which eject the Harpoon from the aircraft.

Whereas the HIAK is an adequate apparatus for allowing a 1760 type aircraft to communicate with an MK 82 type Harpoon Block I missile, it has drawbacks. First, the HIAK only supports one MK 82 data format data rate transfer. In this regard, various Harpoon missiles communicate according to the MK 82 data format at different transfer rates. For example, Harpoon Block I missiles use a 100 KHz clock strobe to transmit a 16-bit data word plus a checksum bit in 1700 microseconds, whereas as Harpoon Block II missiles use a 100–300 KHZ clock strobe to transmit a 16 bit data word plus the parity bit in 300 microseconds. Typically, conventional HIAKs translate commands into MK 82 format at only one set transfer rate, typically that of the Harpoon Block I missile. In this regard, the HIAK cannot not support multiple MK 82 data format transfer rates, such as that of both the Harpoon Block I and Harpoon Block II missiles.

Second, the HIAK typically comprises a separate electronic box and set of cables, mounted on a pylon or launch platform and physically detachable from the aircraft to facilitate interchangeability and maintainability. In this regard, the HIAK generally requires an unnecessarily large amount of space on the aircraft and adds undesirable weight to the aircraft. Additionally, because of the number and type of discrete components that make up the HIAK, the HIAK is generally a very expensive interface. Also, because of the complexity of the HIAK, it can be very hard to connect and disconnect from the aircraft as the types of stores attached to the aircraft change. As such, the HIAK missionizes the aircraft by requiring a dedicated aircraft to perform separate missions depending on the desired type of store for the mission.

SUMMARY OF THE INVENTION

In light of the foregoing background, the present invention provides an improved signal conditioning element that provides expanded formatting function to add compatibility for the various transfer rates of the MK 82 data format. Additionally, the signal conditioning element of the present invention can be implemented in an application specific integrated circuit (ASIC). In this regard, the signal conditioning element provides signal conditioning between the aircraft and store in a manner that is less expensive than the conventional HIAK, and requires less space and weight. Also, by requiring less space, the signal conditioning element of the present invention can be integrated into a store umbilical that couples the aircraft and the store, or into an aircraft pylon wiring. As such, the signal conditioning element can be easily installed and changed to accommodate different types of stores, thereby eliminating the missionizing associated with conventional HIAKs. According to one embodiment, the present invention provides a signal conditioning system for translating communications between an aircraft and an associated store. The system includes a store umbilical element that electrically and mechanically couples the aircraft and the store, and facilitates communications between the aircraft and associated store. The store umbilical element includes an aircraft connector and a store connector. The aircraft connector is electrically connected to the aircraft and directs communications to and from the aircraft according to a first predetermined format, such as a Mil-Std-1760 format, at a first predefined transfer rate. And the store connector is electrically connected to the store and directs communications to and from the store according to a second predetermined format, such as a MK 82 Digital Data Bus format, at at least one second transfer rate.

The system also includes a signal conditioning element comprising an ASIC electrically connected between the aircraft connector and the store connector of the store umbilical element. The signal conditioning element includes a translation element located between the aircraft and the store connectors for receiving first predetermined format communications from the aircraft connector at the first predefined bit rate and thereafter outputting corresponding second predetermined format communications to the store connector at at least one second transfer rate. Conversely, the translation element is also capable of receiving second predetermined format communications from the store connector at at least one second transfer rate and thereafter outputting corresponding first predetermined format communications to the aircraft connector at the first predefined bit rate. To direct communications between the aircraft connector and the store connector via the translation element, the system additionally includes a processing element. According to one embodiment, the processing element is capable of selecting the second transfer rate based upon the associated store. And in a further embodiment, the processing element is capable of controlling the translation element based on the selected second transfer rate.

According to another embodiment, the translation element includes a first formatting element, a second formatting element and a memory element electrically connected between the first and second formatting elements. In this embodiment, the first formatting element, such as a first encoder and a first decoder, is capable of receiving first predetermined format communications from the aircraft connector at the first predefined transfer rate, encoding the first predetermined format communications and thereafter transmitting the encoded communications. The first formatting element is also capable of receiving encoded communications, decoding the encoded communications into first predetermined format communications and thereafter transmitting the first predetermined format communications to the aircraft connector at the first predefined transfer rate.

Similar to the first formatting element, the second formatting element, such as a second encoder and a second decoder, is capable of receiving second predetermined format communications from the store connector at at least one second transfer rate, encoding the second predetermined format communications and thereafter transmitting the encoded communications. Additionally, the second formatting element is capable of receiving encoded communications, decoding the encoded communications into second predetermined format communications and thereafter transmitting the second predetermined format communications to the store connector at at least one second transfer rate.

The memory element, which is electrically connected between the first and the second formatting elements, is capable of receiving encoded communications from the first formatting element, storing the encoded communications and thereafter transmitting the encoded communications to said second formatting element. Conversely, the memory element is also capable of receiving encoded communications from the second formatting element, storing the encoded communications and thereafter transmitting the encoded communications to the first formatting element.

According to another embodiment, the signal conditioning element further includes an aircraft communications interface electrically connected between the aircraft connector and the translation element. The aircraft communications interface includes at least one transmitter for transmitting first predetermined format communications to the aircraft at the first predefined transfer rate, and at least one receiver for receiving first predetermined format communications from the aircraft at the first predefined transfer rate. Additionally, the aircraft communications interface includes an address element for receiving addressing information from the aircraft associated with the store.

Therefore, the present invention provides greater formatting functionality in a less expensive and generally smaller and lighter signal conditioning element than a conventional HIAK. Because the signal conditioning element can be implemented in an ASIC, the signal conditioning element of the present invention can also be integrated into a store umbilical cable that couples the aircraft and the store, or into an aircraft pylon wiring. In this regard, the signal conditioning element can be easily installed and changed to accommodate different types of stores.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
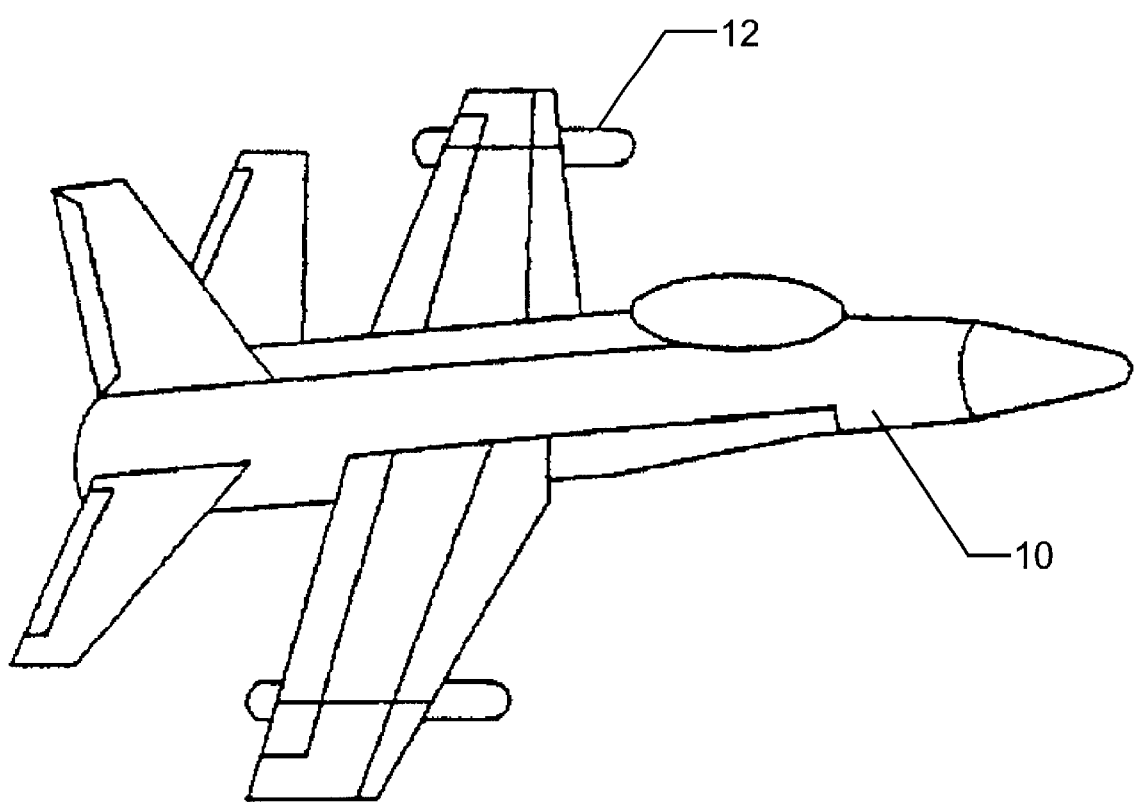
FIG. 1 is a perspective view showing an aircraft carrying a Harpoon missile.

Referring now to FIG. 1, an aircraft 10 and one type of associated store is illustrated. The aircraft is generally adapted to process signals in accordance with a first predetermined format, preferably the Mil-Std-1760 format, which includes a Mil-Std-1553 bus compatibility. The aircraft can be, for example, an F-15 Eagle aircraft manufactured by The Boeing Company, or an F-16 Falcon aircraft manufactured by Lockheed Aeronautical Systems Company. The aircraft can also be, however, any number of other aircraft adapted to communicate with and deploy stores without departing from the spirit and scope of the present invention.

A missile 12 represents one type of associated store that may be carried on the aircraft. For example, the missile may be a Harpoon Block I missile or Harpoon Block II missile, both manufactured by The Boeing Company. The missile is generally adapted to process signals in accordance with a second predetermined format, preferably the signal format known as Harpoon MK 82 Digital Data Bus. As is known to those skilled in the art, the MK 82 Digital Data Bus provides four signals, including three input signals consisting of a clock strobe, a missile data out signal consisting of 16 bits plus a parity bit, and a data enable signal, and one output signal (a data in signal). As also known to those skilled in the art, various transfer rates exist for MK 82 Digital Data Bus formatted communications. For example, Harpoon Block I missiles operate with a 100 KHz clock strobe to transfer a word every 1700 microseconds. In contrast, Harpoon Block II missiles operate with a 100–300 KHz clock strobe to transfer a word every 300 microseconds. In accordance with the present invention, the aircraft may carry and deploy a wide variety of stores, wherein each such store processes signals and interfaces with the aircraft according to a different store signal format and/or a different transfer rate.

Figure 2:
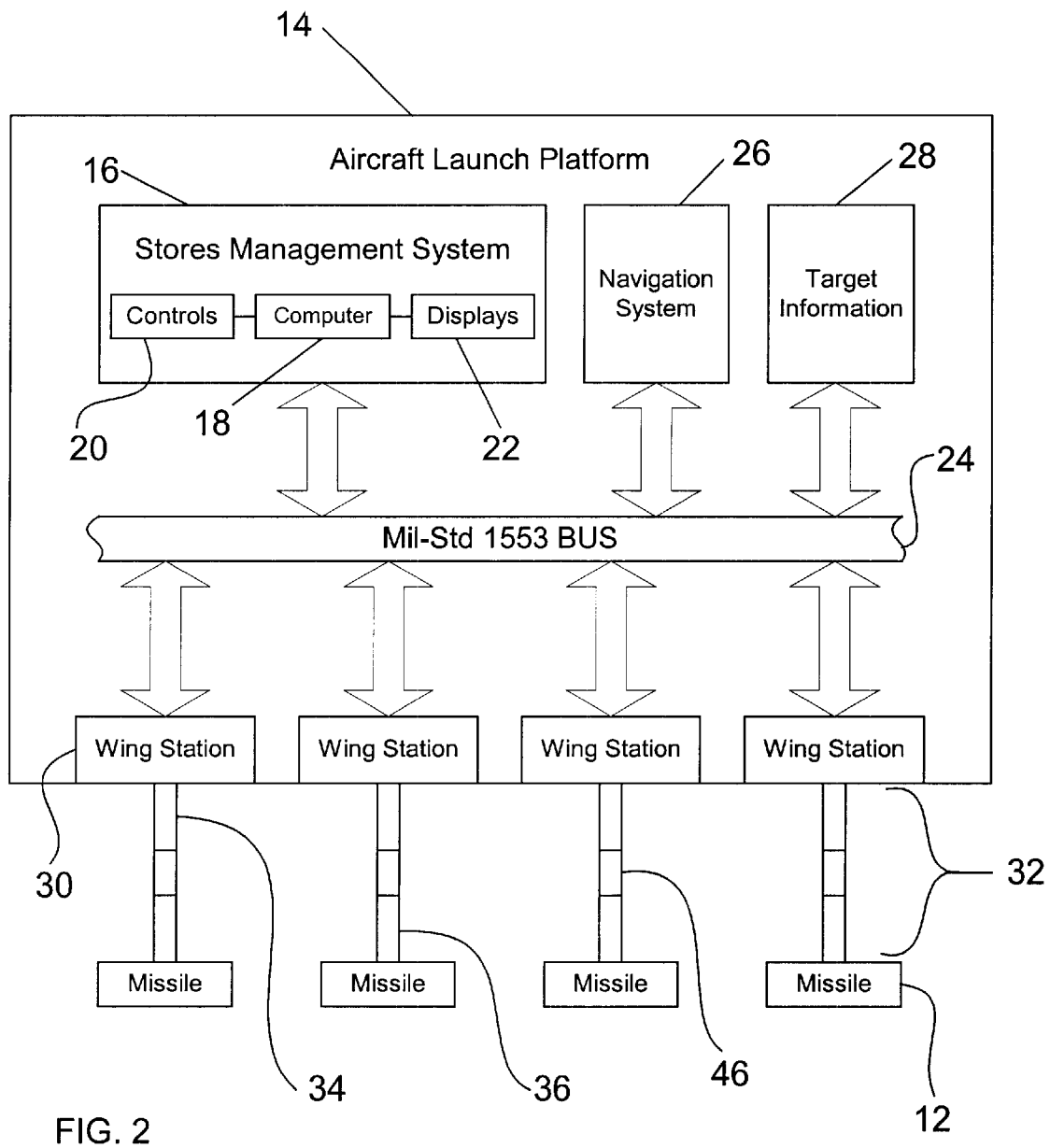
FIG. 2 is a block diagram illustrating one embodiment of an aircraft system including the signal conditioning system of the present invention according to one embodiment.

As illustrated in FIG. 2, the aircraft 10 bidirectionally communicates with the associated store via a launch platform 14 that has several configurations of avionics equipment which are used to support and deploy the missiles 12. The aircraft also includes a crewstation that generally contains a plurality of controls and displays devices, such as head-down and head-up video displays, a control stick, and a throttle, which are used by an aircrew to fly the aircraft and to interact with, and deploy, the associated stores. In this regard, the crewstation controls and display devices communicate with a stores management system 16, which resides on the launch platform and controls the overall operation of many of the aircraft subsystems, such as during the launch sequence of the weapon store. The stores management system typically includes a computer 18, an aircraft controls module 20 and a displays module 22. The control module, in conjunction with the computer, make up the unique electrical circuitry that controls the flight of the aircraft and the deployment of the armament systems, including the deployment of an associated missile. The display module, in conjunction with the computer, provides a display and controls for the crew such that they can further monitor the flight of the aircraft and the deployment of the associated missiles.

The stores management system 16 communicates with a number of other avionics equipment via an avionics interface bus 24. In accordance with the Mil-Std-1760 compatible aircraft 10, the avionics interface bus is configured in accordance with Mil-Std-1553, entitled Military Standard Aircraft Internal Time Division Command/Response Multiplex Data Bus (with which its revisions and updates is incorporated by reference herein for all purposes) and includes both a primary and a reserve data bus for transmitting signals between the various pieces of avionics equipment, and a bus controller (not illustrated), such as a Mil-Std-1553 bus controller, for controlling the signal transmission on the primary and reserve buses. Each of the avionics equipment associated with the avionics bus is considered a bus controller or remote terminal and a single avionics bus configured in accordance with Mil-Std-1553 may support up to 31 separate remote terminals. Preferably, signals are initially attempted to be transmitted via the primary data bus and, if the primary bus is unavailable, the signals are transmitted via the reserve data bus. By providing both the primary and reserve data buses, the reliability of signal transmission between the various pieces of avionics equipment is enhanced.

The launch platform 14 can additionally include a navigation system 26 that bidirectionally communicates with the stores management system 16 and with the missile 12 such that missile orientation and mission-planning information can be downloaded to the missile 12 at any time prior to launch. In this regard, the aircrew can input, into the stores management system, mission-planning commands and data, such as a series of waypoints along which the missile is to fly, and see the input commands and data displayed on the displays module 22. In this way, the aircrew generates, via the navigation system, a set of mission-planning commands and data that is ultimately downloaded to the missile.

Interacting with the navigation system 26, the launch platform 14 can include a target information element 28, which is operable to receive target data, such as image data and/or location data, from the stores management system 16 and send the target data to the missile 12. For example, the aircraft 10 can include a receiver for receiving a transmission of target image data acquired by a national sensor, such as by satellite surveillance. Additionally, or alternatively, the aircraft can include a receiver for receiving target location data from a remote transmitter. The target location data may include, for example, the GPS (Global Positioning System) coordinates of the target and aircraft. The target data is typically stored in a memory unit on board the missile.

Figure 3:
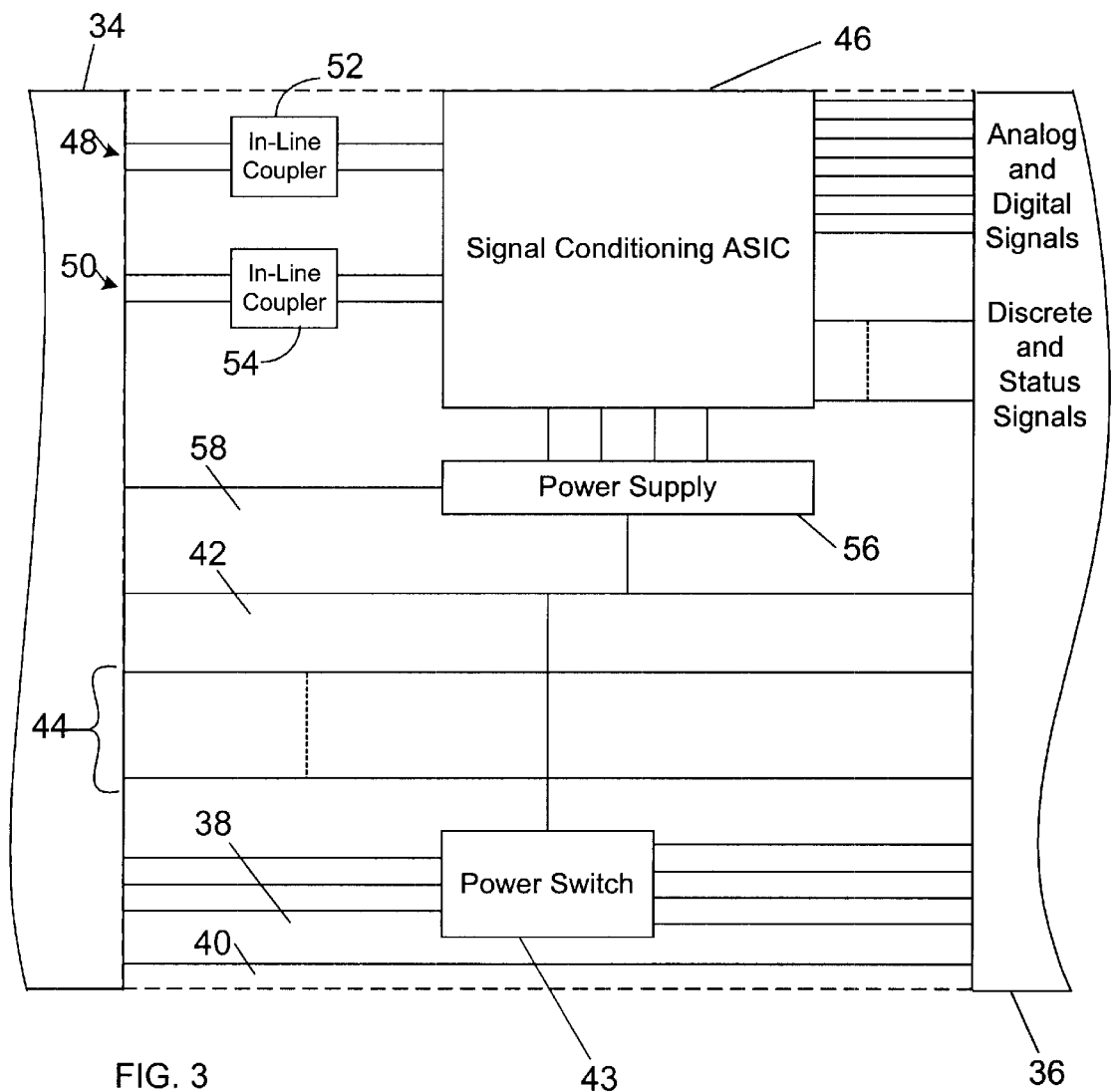
FIG. 3 is an exploded block diagram of the store umbilical cable shown in FIG. 2, highlighting one embodiment of the signal conditioning element of the present invention.

The launch platform 14 can also include a plurality of wing stations 30 for carrying respective missiles 12. To join the aircraft 10 and associated missiles 12, and act as conduit for communications between the aircraft and missiles, disconnectable umbilical cables 32 (comprising an aircraft connector 34 and a store connector 36), are provided to connect the respective missiles to the launch platform and allow the missiles to disconnect from the aircraft 10 upon launch. The umbilical cables can provide AC power, e.g., three-phase 115 volt 400 Hz alternating current, to the missile from a conventional aircraft power supply (not shown) via AC power lines 38 and neutral line 40, as shown in FIG. 3. In addition, the umbilical cables can provide DC power, e.g., 28 volt direct current, to the missile from a conventional power supply (also not shown) via DC power line 42. A power switch 43 is electrically connected to the AC and DC power lines to control power to the missile, such as from the stores management system 16. Also, the umbilical cables can provide the missiles with signals via signal lines 44 that are associated with deployment of the missile, such as a release consent signal, an interlock signal and an address signal that identify the missile location.

Figure 4:
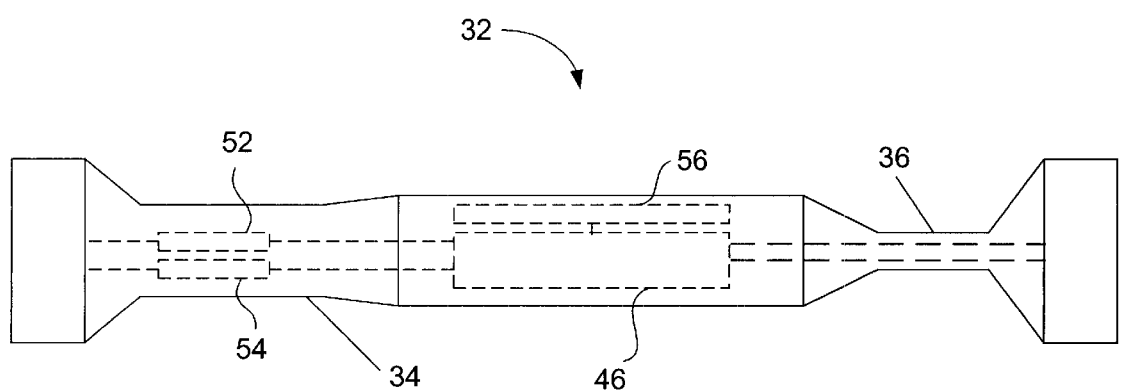
FIG. 4 is a block diagram of one embodiment of the signal conditioning element of the present invention.

To translate signals between the aircraft 10 and the missile 12, the present invention provides a signal conditioning element 46. The signal conditioning element translates Mil-Std-1760 formatted signals received via the avionics interface bus 24 into MK 82 formatted signals, which the associated missile is adapted to process. The signal conditioning element then transmits the translated signals to the missile at a transfer rate depending on the type of missile. Similarly, the signal conditioning element receives signals from the missile, translates the signals from the MK 82 format to the Mil-Std-1760 format, and then transmits the translated signals to the aircraft. Advantageously, the signal conditioning element comprises an application specific integrated circuit (ASIC) such that it takes up less space than a conventional HIAK. As such, the signal conditioning element can, but need not, be mounted within the respective umbilical cable 32, as shown in FIG. 4, or into an aircraft pylon wiring.

Preferably, in embodiments including the signal conditioning element mounted within the umbilical element or aircraft pylon wiring, the ASIC is designed such that the ASIC is capable of operating in an expanded temperature range, such as from approximately –55° Celsius to approximately 125° Celsius. Additionally, while the HIAK traditionally interfaces with the Harpoon missile for functions other than signal conditioning, other features of the aircraft system preferably perform such functions in aircraft employing the present invention. For example, video processing of Harpoon BIT (built-in-test) status, which is typically performed in a conventional HIAK, can be performed in an Advanced Conventional Remote Interface Unit (ACRIU), which is also preferably mounted within the aircraft pylon wiring.

As stated, the avionics interface bus 24 is configured in accordance with Mil-Std-1553 and includes both a primary data bus 48 and a reserve data bus 50. In this regard, a primary in-line coupler 52 and a reserve in-line coupler 54 connect the data buses of the avionics interface bus with the signal conditioning element 46. To provide power to the signal conditioning element, a power supply 56 is electrically connected to the signal conditioning element. The power supply can comprise any of a number of elements but, in a preferred embodiment, the power supply comprises a DC-to-DC converter electrically connected to the DC power line supplying DC power to the missile 12, and including a return line 58. The DC-to-DC converter can convert the DC power from the DC power line, e.g., 28 volt DC power, to levels for use by the signal conditioning element, preferably, +5 volts DC at 100 mA, and +/–15 volts at 300 mA. Preferably, in embodiments wherein the signal conditioning element mounted within the umbilical element or aircraft pylon wiring, the DC-to-DC converter is also mounted within the umbilical element or aircraft pylon wiring. In this regard, the DC-to-DC converter is also preferably designed such that the DC-to-DC converter is capable of operating in an expanded temperature range, such as from approximately –55° Celsius to approximately 125° Celsius.

According to the invention, the signal conditioning element 46 is adapted to process a variety of signals, including discrete signals, status signals, digital and analog signals, as such are known to those skilled in the art. In one embodiment, the signal conditioning element processes signals received by the avionics interface bus 24, translates the signals to corresponding MK82 formatted signals and thereafter transmits the MK 82 signals to the missile 12. As an example, the aircraft 10 may transmit discrete signals to the missile to select or deselect the missile, indicate to the missile an intent to launch (ITL) and release the missile from the launch platform 14 or abort a release. In addition, discrete signals may request a status of the missile such as whether the missile is present, operable, and enabled. In return, the missile may transmit MK 82 signals to the signal conditioning element to translate into Mil-Std-1760 formatted signals for transmission to the avionics interface bus and, thus, the store management system. The missile may transmit signals acknowledging a previous discrete signal from the stores management system 16, or the missile may transmit signals indicating the status of the missile in response to a status request. The analog and digital signals transmitted between the aircraft and missile, and translated by the signal conditioning element, can include, for example, information transmitted to the missile, typically to the mid-course guidance unit (MGU) of the missile, from the target information element and/or navigation system. These analog and digital signals can include any of a number of signals transmitted between the aircraft and missile, as such are known, including signals representing the "x" and "y" coordinates of a cursor on a video display (not shown) for targeting the missile.

Figure 5:
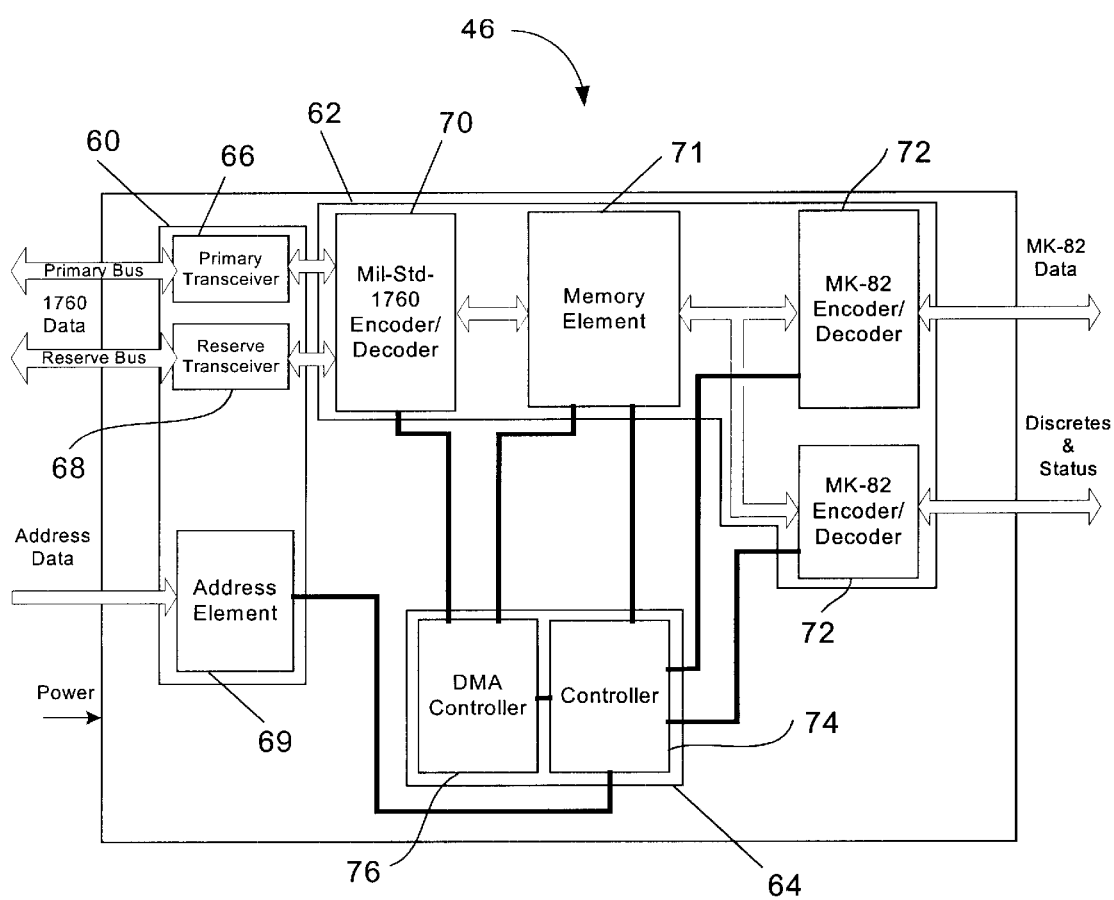
FIG. 5 is a schematic diagram illustrating the signal conditioning element incorporated into a store umbilical cable according to one embodiment of the present invention.

Referring now to FIG. 5, the signal conditioning element 46 includes an aircraft communications interface 60, a translation element 62 and a processing element 64. The aircraft communications interface includes a primary transceiver 66 and a reserve transceiver 68 connected to the primary data bus and the reserve data bus, respectively, for receiving and transmitting Mil-Std-1760 communications between the avionics interface bus 24 and the signal conditioning element. It should be understood that while the primary and reserve transceivers can both transmit and receive communications, the primary and reserve transceivers can each comprise a transmitter and receiver for performing the respective functions. The aircraft communications interface also includes an address element 69, which can comprise any of a number of logic elements. The address element accepts address information from the avionics interface bus and compares the information to the unique wiring address code of the aircraft pylon to determine whether communications on the avionics interface bus are intended for the respective missile 12, and performs a parity check on the address information for error detection.

Electrically disposed between the transceivers 66, 68 and the missile 12, the signal conditioning element 46 includes the translation element 62, which comprises a Mil-Std-1760 encoder/decoder 70, a memory element 71 and at least one MK 82 encoder/decoder 72. While the Mil-Std-1760 encoder/decoder and the MK 82 encoder/decoders each preferably comprise a single element, the Mil-Std-1760 encoder/decoder and the MK 82 encoder/decoders can each comprise a separate encoder and decoder. The Mil-Std-1760 encoder/decoder (i.e., first formatting element comprising a first encoder and a first decoder) is capable of receiving Mil-Std-1760 communications from the transceivers, encoding the communications into any one of a number of known machine-readable formats, and thereafter transmitting the encoded communications. In the same manner, the Mil-Std-1760 encoder/decoder is capable of receiving encoded communications, decoding the encoded communications into Mil-Std-1760 communications, and thereafter transmitting the Mil-Std-1760 communications to the transceivers.

The MK 82 encoder/decoders 72 (i.e., second formatting elements comprising second encoders and second decoders) are capable of receiving MK 82 communications from the missile, encoding the communications into the same format as the Mil-Std-1760 encoder/decoder, and thereafter transmitting the encoded communications. Also, the MK 82 encoder/decoders are capable of receiving encoded communications, decoding the encoded communications into MK 82 communications, and thereafter transmitting the MK 82 communications to the missile 12. Preferably, the translation element 62 includes two MK 82 encoder/decoders so that one can receive, encode/decode and transmit the analog and digital signals, and the other can receive, encode/decode and transmit the discrete and status signals.

Disposed in between the Mil-Std-1760 encoder/decoder 70 and the MK 82 encoder/decoders 72, the translation element includes the memory element 71 to buffer communications translated between the aircraft 10 and missile 12 due to different transfer rate transmissions, as described below. The memory element is capable of receiving the encoded communications from the Mil-Std-1760 encoder/decoder or the MK 82 encoder/decoders and storing the encoded communications. After storing the encoded communications, the memory element is capable of transmitting the encoded communications to the MK 82 encoder/decoders or the Mil-Std-1760 encoder/decoder, respectively, as described below.

The processing element 64 of the signal conditioning element 46 is electrically connected to the aircraft communications interface 60 and translation element 62, and includes a controller 74 and a direct-memory-access (DMA) controller 76. The controller controls the flow of communications from the memory element 71 through the MK 82 encoder/decoders 72 to the missile. The controller also accepts data from the address element 69 indicating an address match from address information transmitted via the avionics interface bus 24 and the address of the respective missile 12. Additionally, the controller can determine the type of the respective missile and thereby control the transfer rate of the MK 82 communications to the missile. The DMA controller, which is electrically connected to the Mil-Std-1760 encoder/decoder 70, the memory element and the controller, directs communications into the signal conditioning element in accordance with a direct memory access method, as described below.

Figure 6:
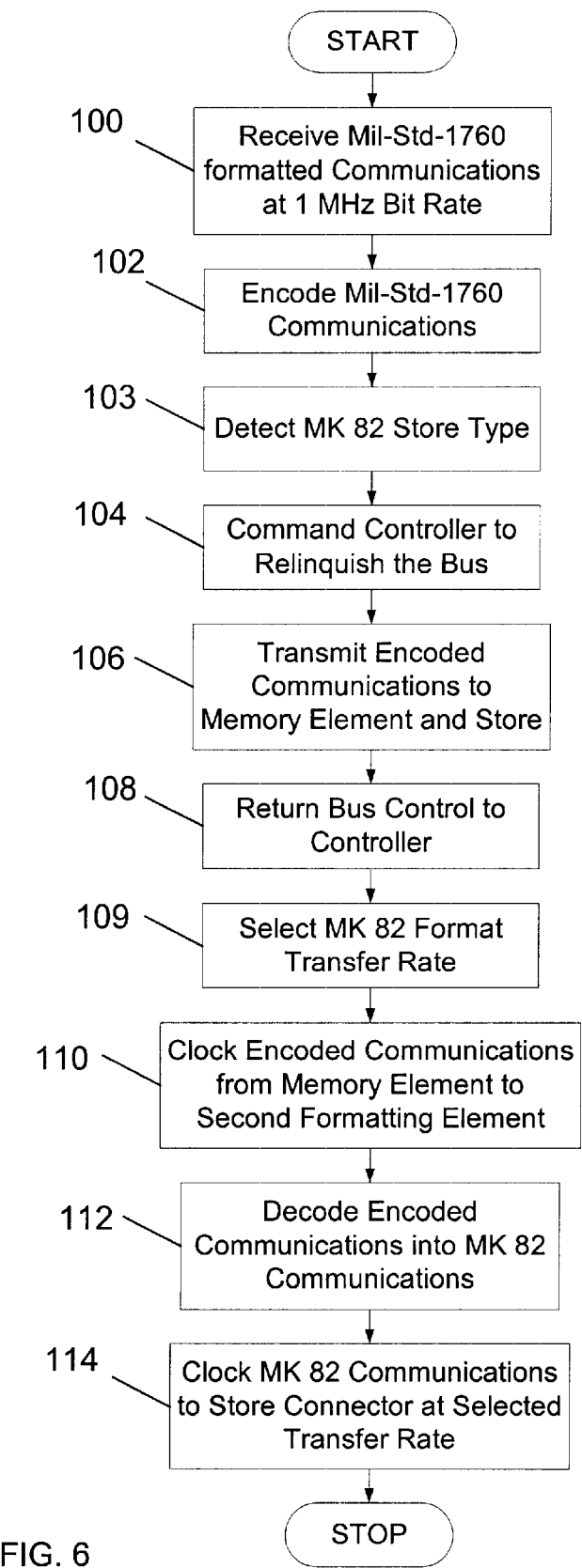
FIG. 6 is a flow diagram illustrating some of the steps in the transmission of communications from an aircraft to an associated store implementing the system of one embodiment of the present invention.

In operation, and referring to FIG. 6 setting forth one exemplary embodiment, when the aircraft 10 desires to communicate with an associated missile 12, the aircraft transmits Mil-Std-1760 type formatted communications at a first predefined transfer rate, preferably at a bit rate of 1 MHz, via the avionics interface bus 24 through the aircraft connector 34 of the umbilical element 32 to the aircraft communications interface 60 of the signal conditioning element 46. Of the communications from the aircraft 10, the address element 69 receives address information and the transceivers receive data, such as the discrete, analog or digital signals, in accordance with the Mil-Std-1553 bus configuration. The address element compares the address information with the address of the associated store and performs a parity check on the address information for error detection to determine whether the aircraft transmitted the data for the associated store. If the address element matches the address information and does not detect an error, the address element sends a signal to the controller 74 indicating an address match (block 100). If the address element does not match the address information or detects an error, the aircraft will typically reattempt to establish communications with the associated missile. However, if after a predetermined number of attempts the aircraft still cannot establish communication with the missile, the aircraft will typically abort the communication attempt.

As the transceivers 66, 68 receive the Mil-Std-1760 formatted data, the transceivers transmit the Mil-Std-1760 data to the Mil-Std-1760 encoder/decoder 70. The Mil-Std-1760 encoder/decoder encodes the Mil-Std-1760 formatted data into a machine readable language for transmission to the memory element 71 (block 102). In addition, the Mil-Std-1760 formatted data transmitted to the Mil-Std-1760 encoder/decoder includes an identification code identifying the type of associated missile, such as Block I or Block II Harpoon missile. The Mil-Std-1760 encoder/decoder receives the identification code, and, thereafter, transmits the identification code to the controller. From the identification code, the controller can identify the type of associated missile and select the second transfer rate depending on the type of associated missile, as described below (block 103).

Because of the high transfer rate of the Mil-Std-1760 data transmission as compared to the speed of the controller 74, the controller must relinquish control of the elements of the signal conditioning element 46 before the Mil-Std-1760 encoder/decoder can adequately transmit the encoded data to the memory element. In this regard, the Mil-Std-1760 encoder/decoder transmits a signal to the DMA controller 76. In accordance with known direct memory access methods, the DMA controller communicates with the controller to inform the controller to relinquish control of the elements (block 104). After the controller has relinquished control of the elements, the Mil-Std-1760 encoder/decoder transmits the encoded data to the memory element, which stores the encoded data (block 106). And after the memory element has received and stored all of the data, the memory element signals the DMA controller to inform the controller to resume control of the elements of the signal conditioning element (block 108).

The memory element 71, by storing the encoded data from the Mil-Std-1760 encoder/decoder 70, acts to buffer the 1 MHz bit rate of the encoded data from the Mil-Std-1760 encoder/decoder for transmission to the store in MK 82 Digital Data Bus format at a slower, second transfer rate. In this regard, the controller 74 sends a clock signal to the memory element to thereby transmit the encoded data from the memory element to the MK 82 encoder/decoders 72.

Before the MK 82 encoder/decoders receive the encoded data, the controller selects the second transfer rate, the transfer rate of the MK 82 encoder/decoders, based upon the identification code the controller previously received from the Mil-Std-1760 encoder/decoder that identified the type of associated missile (block 109). For example, if the identification code identifies the missile as a Block I missile, the controller would select the second transfer rate to a bit rate of 100 KHz to transfer a word every 1700 microseconds. In contrast, if the identification code identified a Harpoon Block II missile, the controller would select the second transfer rate to a bit rate between 100–300 KHz and to transfer a word every 300 microseconds.

After the transfer rate of the MK 82 encoder/decoders has been selected, the controller 74 sends a clock signal to the memory element to thereby transmit the encoded data from the memory element to the MK 82 encoder/decoders 72 (block 110). As the MK 82 encoder/decoders receive the encoded data, the MK 82 encoder/decoders decode the encoded data into MK 82 Digital Data Bus formatted communications (block 112). The controller then sends a clock signal to the MK 82 encoder/decoders according to the selected second transfer rate to thereby transmit the MK 82 Digital Data Bus formatted communications to the missile 12 through the store connector 36 of the umbilical element 32 (block 114). Because the controller sends the clock signal to the MK 82 encoder/decoders at the second transfer rate, the clock signal sent from the controller to the memory element to transmit the encoded data from the memory element can be at any of a number of different transfer rates without departing from the spirit and scope of the present invention.

Figure 7:
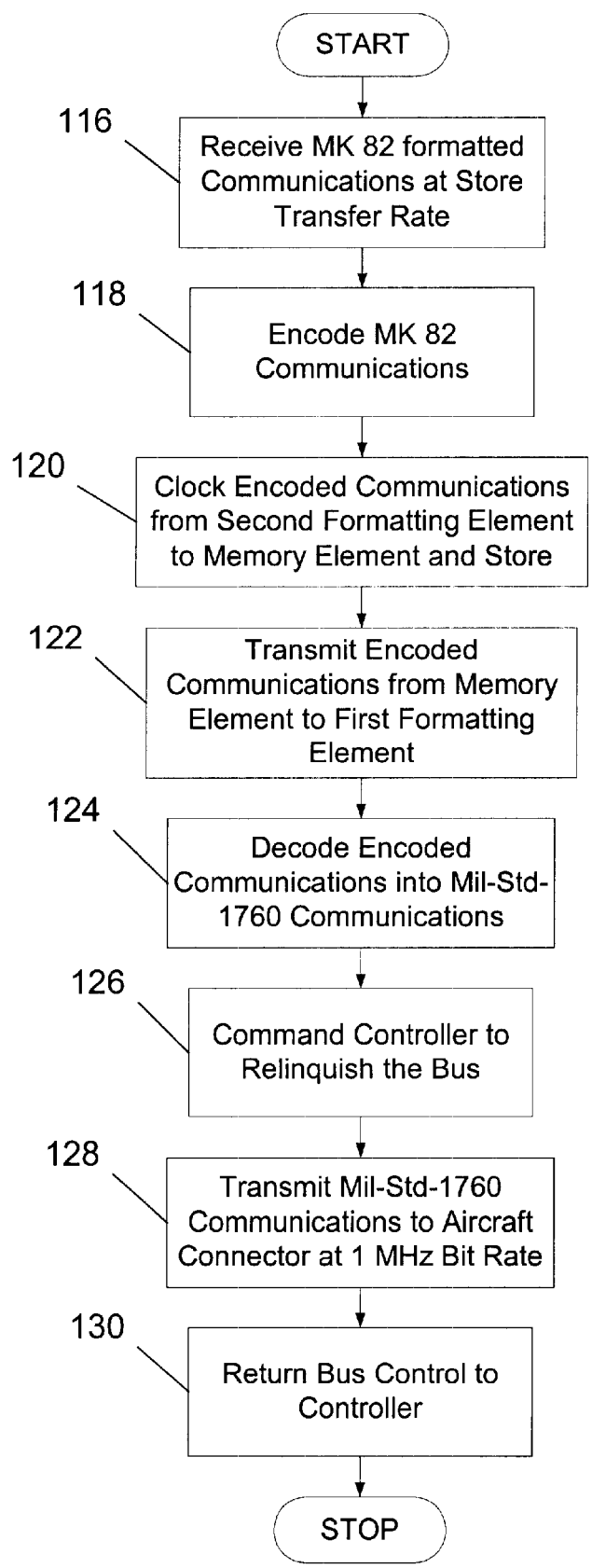
FIG. 7 is a flow diagram illustrating some of the steps in the transmission of communications from the store to the aircraft implementing the system of one embodiment of the present invention.

Referring now to FIG. 7, which depicts one exemplary embodiment, when the missile 12 desires to communicate with the aircraft 10, such as by transmitting a status signal, the missile transmits MK 82 Digital Data Bus formatted communications at at least one second transfer rate, depending on the type of missile, through the store connector 36 of the umbilical element 32 to the signal conditioning element 46. The MK 82 encoder/decoders 72 of the signal conditioning element receive the MK 82 Digital Data Bus formatted communications and, like the Mil-Std-1760 encoder/decoder 70 receiving Mil-Std-1760 communications, encode the MK 82 Digital Data Bus communications into encoded data (blocks 116 and 118). The controller 74 then clocks the encoded data from the MK 82 encoder/decoders into the memory element 71 at the second transfer rate, and the memory element stores the encoded data (block 120).

After the memory element 71 stores the encoded data, the controller 74 sends clock signals to the memory element to thereby clock the encoded data to the Mil-Std-1760 encoder/decoder 70, which decodes the encoded data to Mil-Std-1760 formatted communications (blocks 122 and 124). The Mil-Std-1760 encoder, as before, sends a signal to the DMA controller 76 to inform the controller to relinquish control of the elements of the signal conditioning element 46 (block 126). In this regard, the Mil-Std-1760 encoder/decoder can transmit the Mil-Std-1760 formatted communications at the first predefined transfer rate, preferably at a bit rate of 1 MHz. After the controller has relinquished control, the Mil-Std-1760 encoder/decoder transmits the Mil-Std-1760 formatted communications at the first predetermined transfer rate to the transceivers 66, 68 which, in turn, transmit the Mil-Std-1760 formatted communications to the avionics interface bus 24 through the aircraft connector 34 of the umbilical element 32 (block 128). And after the Mil-Std-1760 encoder/decoder has transmitted all of the Mil-Std-1760 formatted communications, the Mil-Std-1760 encoder/decoder sends a signal to the DMA controller to thereby inform the controller to resume control of the elements (block 130).

Therefore, the present invention provides an improved signal conditioning element that can be implemented in an application specific integrated circuit (ASIC), which provides expanded formatting, and is less expensive, requires less space and is lighter than a conventional HIAK. Additionally, by implementing the signal conditioning element in an ASIC, the signal conditioning element can be integrated into a store umbilical that couples the aircraft and the store. In this regard, the signal conditioning element can be easily installed and changed to accommodate different types of stores.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A signal conditioning system for translating communications between an aircraft and an associated store, said system comprising:

a store umbilical element that electrically and mechanically couples the aircraft and the store, wherein said store umbilical element facilitates the communications between the aircraft and associated store, said store umbilical element comprising:

an aircraft connector electrically connected to the aircraft for directing communications to and from the aircraft according to a first predetermined format at a first predefined transfer rate; and a store connector electrically connected to the store for directing communications to and from the store according to a second predetermined format at at least one second transfer rate; and a signal conditioning element electrically connected between said aircraft connector and said store connector, wherein said signal conditioning element is an application specific integrated circuit, and wherein said signal conditioning element comprises:

a translation element disposed between said aircraft connector and said store connector, wherein said translation element is capable of receiving first predetermined format communications from said aircraft connector at the first predefined transfer rate and thereafter outputting corresponding second predetermined format communications to the store connector at the at least one second transfer rate, and wherein said translation element is capable of receiving second predetermined format communications from the store connector at the at least one second transfer rate and thereafter outputting corresponding first predetermined format communications to said aircraft connector at the first predefined transfer rate; and a processing element electrically connected to said translation element, wherein said processing element is capable of directing communications between said aircraft connector and said store connector via said translation element.

2. A signal conditioning system according to claim 1, wherein said translation element comprises:

a first formatting element capable of receiving first predetermined format communications from said aircraft connector at the first predefined transfer rate, encoding the first predetermined format communications and thereafter transmitting the encoded communications, and wherein said first formatting element is also capable of receiving encoded communications, decoding the encoded communications into first predetermined format communications and thereafter transmitting the first predetermined format communications to said aircraft connector at the first predefined transfer rate;

at least one second formatting element capable of receiving second predetermined format communications from said store connector at the at least one second transfer rate, encoding the second predetermined format communications and thereafter transmitting the encoded communications, and wherein said at least one second formatting element is also capable of receiving encoded communications, decoding the encoded communications into second predetermined format communications and thereafter transmitting the second predetermined format communications to said store connector at the at least one second transfer rate; and a memory element electrically connected between said first formatting element and said at least one second formatting element, wherein said memory element is capable of receiving encoded communications from said first formatting element, storing the encoded communications and thereafter transmitting the encoded communications to said at least one second formatting element, and wherein said memory element is capable of receiving encoded communications from said at least one second formatting element, storing the encoded communications and thereafter transmitting the encoded communications to said first formatting element.

3. A signal conditioning system according to claim 2, wherein said first formatting element comprises a first encoder and a first decoder, and wherein said at least one second formatting element comprises at least one second encoder and at least one second decoder.

4. A signal conditioning system according to claim 1, wherein said signal conditioning element further comprises an aircraft communications interface electrically connected between said aircraft connector and said translation element, wherein said aircraft communications interface comprises:

at least one transmitter for transmitting first predetermined format communications to the aircraft at the first predefined transfer rate;

at least one receiver for receiving first predetermined format communications from the aircraft at the first predefined transfer rate; and an address element for receiving addressing information from the aircraft associated with the store.

5. A signal conditioning system according to claim 1, wherein the first predetermined format is a Mil-Std-1760 type format, and wherein the second predetermined format is a MK 82 Digital Data Bus format.

6. A signal conditioning system according to claim 1, wherein said processing element is capable of selecting the at least one second transfer rate based on the associated store.

7. A signal conditioning system according to claim 6, wherein said processing element is capable of controlling said translation element based on the selected at least one second transfer rate.

8. A signal conditioning application specific integrated circuit (ASIC) for translating communications between an aircraft and an associated store, wherein the aircraft communicates according to a Mil-Std-1760 type format at a first predefined transfer rate, and wherein the store communicates according to a MK 82 Digital Data Bus format at at least one second transfer rate, said signal conditioning ASIC comprising:

a translation element disposed between the aircraft and the store, wherein said translation element is capable of receiving Mil-Std-1760 type format communications from the aircraft at the first predefined transfer rate and thereafter outputting MK 82 Digital Data Bus format communications to the store at the at least one second transfer rate, and wherein said translation element is capable of receiving the MK 82 Digital Data Bus communications from the store at the at least one second transfer rate and thereafter outputting Mil-Std-1760 type format communications to the aircraft at the first predefined transfer rate; and a processing element electrically connected to said translation element, wherein said processing element is capable of directing communications between the aircraft and the store via said translation element.

9. A signal conditioning ASIC according to claim 8, wherein said translation element comprises:

a Mil-Std-1760 formatting element capable of receiving Mil-Std-1760 type format communications from the aircraft at the first predefined transfer rate, encoding the Mil-Std-1760 type format communications and thereafter transmitting the encoded communications, and wherein said Mil-Std-1760 formatting element is also capable of receiving encoded communications, decoding the encoded communications into Mil-Std-1760 type format communications and thereafter transmitting the Mil-Std-1760 type format communications to the aircraft at the first predefined transfer rate;

at least one MK 82 formatting element capable of receiving MK 82 Digital Data Bus format communications from the store at the at least one second transfer rate, encoding the MK 82 Digital Data Bus format communications and thereafter transmitting the encoded communications, and wherein said at least one MK 82 formatting element is also capable of receiving encoded communications, decoding the encoded communications into MK 82 Digital Data Bus format communications and thereafter transmitting the MK 82 Digital Data Bus format communications to the store at the at least one second transfer rate; and a memory element electrically connected between said Mil-Std-1760 formatting element and said at least one MK 82 formatting element, wherein said memory element is capable of receiving encoded communications from said Mil-Std-1760 formatting element, storing the encoded communications and thereafter transmitting the encoded communications to said at least one MK 82 formatting element, and wherein said memory element is capable of receiving encoded communications from said at least one MK 82 formatting element, storing the encoded communications and thereafter transmitting the encoded communications to said Mil-Std-1760 formatting element.

10. A signal conditioning ASIC according to claim 9, wherein said Mil-Std-1760 formatting element comprises a Mil-Std-1760 encoder and a Mil-Std-1760 decoder, and wherein said at least one MK 82 formatting element comprises at least one MK 82 encoder and at least one MK 82 decoder.

11. A signal conditioning ASIC according to claim 8 further comprising an aircraft communications interface electrically connected between the aircraft and said translation element, wherein said aircraft communications interface comprises:

at least one transmitter for transmitting Mil-Std-1760 type format communications to the aircraft at the first predefined transfer rate;

at least one receiver for receiving Mil-Std-1760 type format communications from the aircraft at the first predefined transfer rate; and an address element for receiving addressing information from the aircraft associated with the store.

12. A signal conditioning ASIC according to claim 8, wherein said signal conditioning ASIC is adapted to be disposed within a store umbilical element that mechanically connects the aircraft and the associated store.

13. A signal conditioning ASIC according to claim 8, wherein said processing element is capable of selecting the at least one second transfer rate based on the associated store.

14. A signal conditioning ASIC according to claim 13, wherein said processing element is capable of controlling said translation element based on the selected at least one second transfer rate.

15. A communication apparatus for electrically and mechanically connecting an aircraft and an associated store and facilitating communications between the aircraft and the store, wherein said communication apparatus connects to the aircraft at an aircraft interface, and wherein the aircraft communicates according to a first predetermined format at a first predefined transfer rate and the store communicates according to a second predetermined format at at least one second transfer rate, said communication apparatus comprising:

a store umbilical element that electrically and mechanically couples the aircraft interface to the store, wherein said store umbilical element facilitates the communications between the aircraft and associated store; and a signal conditioning application specific integrated circuit (ASIC) disposed within said store umbilical element and electrically connected between the aircraft interface and the store, said signal conditioning ASIC comprising:

a translation element capable of receiving the first predetermined format communications from the aircraft interface at the first predefined transfer rate and thereafter outputting the second predetermined format communications to the store at the at least one second transfer rate, and wherein said translation element is capable of receiving the second predetermined format communications from the store at the at least one second transfer rate and thereafter output the first predetermined format communications to the aircraft interface at the first predefined transfer rate; and a processing element electrically connected to said translation element, wherein said processing element is capable of directing communications between the aircraft interface and the store via said translation element.

16. A communication apparatus according to claim 15, wherein said translation element comprises:

a first formatting element capable of receiving first predetermined format communications from the aircraft interface at the first predefined transfer rate, encoding the first predetermined format communications and thereafter transmitting the encoded communications, and wherein said first formatting element is also capable of receiving encoded communications, decoding the encoded communications into first predetermined format communications and thereafter transmitting the first predetermined format communications to the aircraft interface at the first predefined transfer rate;

at least one second formatting element capable of receiving second predetermined format communications from the store at the at least one second transfer rate, encoding the second predetermined format communications and thereafter transmitting the encoded communications, and wherein said at least one second formatting element is also capable of receiving encoded communications, decoding the encoded communications into second predetermined format communications and thereafter transmitting the second predetermined format communications to the store at the at least one second transfer rate; and a memory element electrically connected between said first formatting element and said at least one second formatting element, wherein said memory element is capable of receiving encoded communications from said first formatting element, storing the encoded communications and thereafter transmitting the encoded communications to said at least one second formatting element, and wherein said memory element is capable of receiving encoded communications from said at least one second formatting element, storing the encoded communications and thereafter transmitting the encoded communications to said first formatting element.

17. A communication apparatus according to claim 16, wherein said first formatting element comprises a first encoder and a first decoder, and wherein said at least one second formatting element comprises at least one second encoder and at least one second decoder.

18. A communication apparatus according to claim 15, wherein said signal conditioning ASIC further comprises an aircraft communications interface electrically connected between the aircraft interface and said translation element, wherein said aircraft communications interface comprises:

at least one transmitter for transmitting first predetermined format communications to the aircraft interface at the first predefined transfer rate;

at least one receiver for receiving first predetermined format communications from the aircraft interface at the first predefined transfer rate; and an address element for receiving addressing information from the aircraft interface associated with the store.

19. A communication apparatus according to claim 15, wherein the first predetermined format is a Mil-Std-1760 type format, and wherein the second predetermined format is a MK 82 Digital Data Bus format.

20. A communication apparatus according to claim 15, wherein said processing element is capable of selecting the at least one second transfer rate based on the associated store.

21. A communication apparatus according to claim 20, wherein said processing element is capable of controlling said translation element based on the selected at least one second transfer rate.

\* \* \* \* \*